United States Patent [19]

Vandevelde et al.

[11] Patent Number: 4,469,629

[45] Date of Patent: Sep. 4, 1984

[54] METHOD FOR EXTRACTING FLUORIDE IONS FROM A NUCLEAR FUEL SOLUTION

[75] Inventors: Léon E. J. Vandevelde; Leon H. J. M. Baetsle; Daniel J. G. Huys, all of Mol, Belgium

[73] Assignee: Centre d'Etude de l'Energie Nucleaire, "C.E.N.", Etterbeek, Belgium

[21] Appl. No.: 251,840

[22] Filed: Apr. 8, 1981

[30] Foreign Application Priority Data

Apr. 8, 1980 [FR] France ................................. 80 07836

[51] Int. Cl.³ .......................... G21F 9/04; C01B 33/08
[52] U.S. Cl. ..................................... 252/631; 252/627; 210/768; 423/341
[58] Field of Search .................. 423/324, 342, 6, 4, 423/341; 252/627, 631

[56] References Cited

U.S. PATENT DOCUMENTS 3,846,256 11/1974 Dietrich ................................. 203/33
3,976,759 8/1976 Bennett et al. ................. 423/342 X

OTHER PUBLICATIONS

Clark et al., "The Removal of Trace Contaminants from Recycle Nitric Acid," Nuclear Technology, vol. 53, May 1981, pp. 235-240.

Primary Examiner—Deborah L. Kyle
Assistant Examiner—Catherine S. Kilby
Attorney, Agent, or Firm—Sughrue, Mion, Zinn, Macpeak, and Seas

[57] ABSTRACT

There is described a method for extracting fluoride ions from a nuclear fuel solution which comprises treating said solution with a solid phase from hydrated silica, such as silica gel and/or silicic acid, to bind the fluorine to the silicium, said solid phase then being separated from said solution.

13 Claims, 3 Drawing Figures

METHOD FOR EXTRACTING FLUORIDE IONS FROM A NUCLEAR FUEL SOLUTION

This invention relates to a method for extracting fluoride ions from a nuclear fuel solution, notably of $UO_2$—, $PuO_2$—, $ThO_2$—type, discretely or in admixture, which is obtained by contacting said fuels with a mixture of $HNO_3$ and HF, before a purifying and extracting treatment of said fuels.

Bringing some nuclear fuels such as plutonium oxide and thorium oxide for instance into solution, can only be obtained inexpensively in the presence of fluoride ions with concentrations in the range from 0.05 to 0.5 molar.

As purifying equipments such as the ones making use of the so-called "Purex" method, cannot withstand a fluorine percentage higher than $10^{-4}$ molar, it is required to proceed previous to said treatment, to extracting of fluoride ions from said solution.

Such known extracting lies in complexing the fluorine with $Al^{3+}$ ions. The complex thus formed precipitates and is separated by filtering. Said precipitate cannot however be recycled and does thus comprise a substantial contribution in solid radio-active wastes (see G. A. BURNEY ea., DP-1419 (1976)).

An essential object of this invention is to provide a new method for extracting fluoride ions from said solutions which allows to obviate the drawbacks of the known method which is both simple and efficient while resulting in a smaller amount of radio-active wastes.

For this purpose according to the invention, said solution is treated with a solid phase from hydrated silica, such as silica gel and/or silicic acid, to bind the fluorine to the silicium, said solid phase then being separated from the solution.

Other details and features of the invention will stand out from the following description, given by way of non limitative example and with reference to the accompanying drawings, in which.

Figure 1:
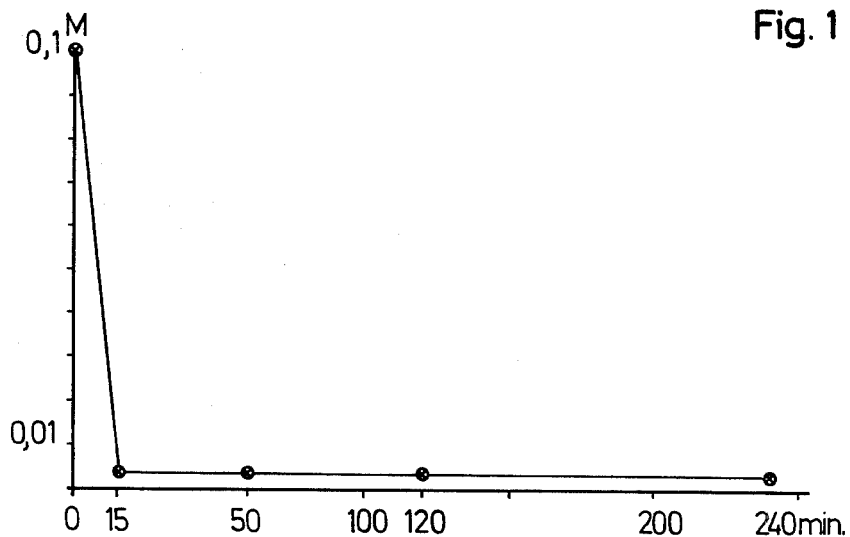
FIG. 1 is a diagram showing the influence of time on the lowering of the fluoride ion percentage in a nuclear fuel solution which has been treated with hydrated silica.

The nuclear fuel to be re-treated is first contacted with a nitric acid solution to bring most of the fuel into solution, notably uranium oxide ($UO_2$).

From said solution is thereafter separated the remaining solid portion which thus contains that fuel which cannot be brought into solution by nitric acid. This is the case for plutonium oxide and thorium oxide.

Said solid portion is then dissolved by means of a mixture from $HNO_3$ and HF.

In practice, it is generally acknowledged that for a nuclear fuel of $UO_2$—$PuO_2$ type obtained by mixing powders and sintering thereof, about 90% are dissolved by nitric acid with the remaining 10% being dissolved by the mixture from $HNO_3$ and HF.

The solution from said 10% of nuclear fuel, which thus contains fluoride ions with concentrations varying from 0.05 to 0.5 molar, according to the nature of the fuel to be dissolved, is then subjected to the method for extracting fluoride ions according to the invention.

It has been noticed that when said nuclear fuel does contain $PuO_2$, a mixture from 10M $HNO_3$+0.1M HF gives very good results for dissolving $PuO_2$, while when the nuclear fuel does contain $ThO_2$, said dissolving mixture is advantageously formed by 13M $HNO_3$+0.5M HF.

According to the invention, said fluorinated solution which contains the completely dissolved nuclear fuel, is contacted with hydrated silica which is formed by silica gel and/or silicic acid, and which is preferably finely powdered.

The fluorine forms a complex with the silica, $H_2SiF_6$ or $SiF_6$, depending on the relative amount of fluorine and silica being present.

According to the temperature at which said treatment occurs, part from said complex remains fixed to the solid phase, while the other part from said complex evaporates.

Said solid phase is then separated, for instance by centrifugating or filtering.

In that case where use is made of a mixture from $HNO_3$ and HF having a 1M-HF concentration, the fluorine content in the solution or liquid phase has changed from 0.1M to about $3.10^{-3}$M which corresponds to a 97% fluorine extraction.

Said liquid phase is then diluted with the nitric solution that does not contain any HF and which has been used to dissolve essentially the uranium oxide.

There is thus obtained a fluorine concentration in the total solution about $10^{-4}$M when the concentrations of dissolved fuel are substantially the same in the fluorinated and non-fluorinated solutions.

According to a particular embodiment of the invention, the nuclear fuel solution containing fluoride ions, is treated by the solid phase from hydrated silica at a temperature lying between 15° C. and 50° C. and preferably at room temperature. In this latter case, the main portion of the fluorine remains fixed to said solid phase in the form of the $H_2SiF_6$ and/or $SiF_4$ complex.

The amount of hydrated silica being used is a function of the initial content in fluoride ions.

For instance it has been noticed that with a 0.1 mole content, hydrated silica amounts lying between 80 and 130 g per liter of the solution, give very good results.

Advantageously the solid phase separated from the solution after forming of the fluorinated complex, is recycled for treating a fresh amount of solution that contains fluoride ions.

When the fluoride content of the hydrated silica becomes too high, said silica is regenerated by pyrohydrolising, before being recycled.

When however the regenerating is too difficult or when the fission product content in the hydrated silica becomes too large, said silica is discharged to a treatment known per se of radio-active wastes.

Said wastes may advantageously be used for preparing glass beads in a known method for treating high-activity wastes by vitrifying.

The vapours from said complex which are formed during the extracting treatment or during the pyrohydrolysis, are recovered in a basic solution, notably a solution from sodium hydroxide or carbonate.

Said solution is then evaporated and the resulting residue is discharged to said treatment of radio-active wastes.

In practice, the method may be applied continuously or discontinuously.

With a discontinuous treatment, said hydrated silica may be fed to the dissolver even after complete dissolving of the nuclear fuels by the mixture from $HNO_3$ and HF. In such a case, no special apparatus is thus required.

With a continuous operation, to the discharge pipe from the dissolver may be connected a cartridge which contains hydrated silica. As soon as said cartridge is saturated, it may be replaced with a fresh cartridge, while the first cartridge is regenerated by pyro-hydrolysis as mentioned above.

Said pyro-hydrolysis may for example be performed by passing superheated steam, for instance at a temperature from 120° to 150° C., over the hydrated silica loaded with fluoride ions, said steam which carries the silico-fluorinated complex then being washed by said basic solution.

As shown in the following table, the temperature has substantially no influence on the fluorine extraction with hydrated silica from a fluorinated nitric solution with 10M $HNO_3$+0.1M HF.

| Test N° | Temperature (°C.) | Residual $F^-$ (M) |
|---|---|---|
| T 1 | 61 | .0042 |
| T 2 | 74 | .0051 |
| T 3 | 81 | .0046 |
| T 4 | 90 | .0056 |
| T 5 | 100 | .0072 |
| T 6 | 21.5 | .0041 |
| T 7 | 22 | .0038 |
| TB 4 (white) | 93 | .10 |

Sample TB4 has undergone a heat treatment without adding hydrated silica. Analysis shows the HF content is not influenced by such treatment.

The reaction rate in the above-defined conditions is very high: after 15 minutes the reaction is substantially completed.

This is shown by the diagram in FIG. 1 which shows along the Y-axis the fluorine concentration in moles per liter, and along the X-axis the reaction time. The amount of silica being used was 3 g for a fluorinated nitric solution (10M $HNO_3$+0.1M HF).

Figure 2:
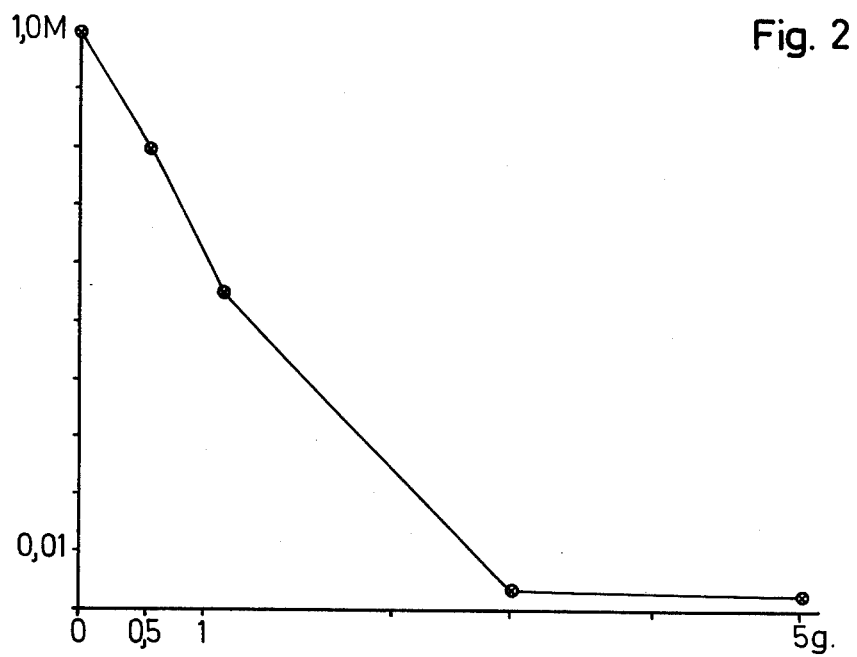
FIG. 2 shows the influence of the amount of hydrated silica being used, on the extracting of fluoride ions from a nuclear fuel solution, during 15 minutes.

FIG. 2 shows the influence of the silica amount for a reaction duration of 15 minutes.

The diagram in FIG. 2 also shows along the Y-axis the content of fluorinated ions in the solution and along the X-axis, the amount of hydrated silica being used.

Figure 3:
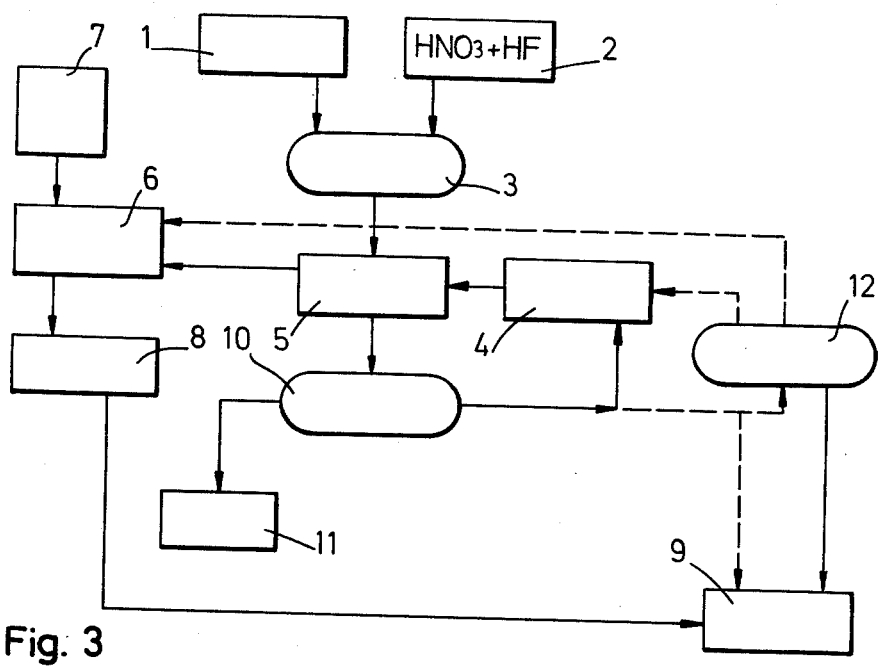

FIG. 3 is a block-diagram from a particular embodiment of the extraction method according to the invention.

The method for fluorinated extraction according to the invention is shown more actually by the following laboratory test:

40 ml. fluorinated nitric solution (10M $HNO_3$+0.1M HF) are contacted with 3 to 5 g hydrated silica (silicic acid a.p.: crushed industrial silica gel).

The mixture was stirred by magnetic stirring, while the atmosphere inside the reaction vessel was swept out by an air stream. Said air together with the vapour carried along have been fed to a wash-bottle containing 10 ml from basic solution (0.5 mole NaOH).

After reacting, the nitric solution thus treated has been filtered over a filter paper (Whatman n° 30).

Said acid solution has then been analyzed regarding the fluorine content thereof—as well as the basic solution from the wash-bottle—by means of a selective electrode (ORION fluoride selective electrode).

The fluorine extraction rate did reach 97%.

The results from said test are the data shown in the diagrams in FIGS. 1 and 2.

FIG. 3 shows a block-diagram of the various steps in a particular embodiment of the method for extracting fluoride ions from a nuclear fuel solution.

The nuclear fuel 1 is contacted with a suitable mixture 2 from $HNO_3$ and HF inside a dissolver 3 where the fuel is brought into solution.

Said solution is then contacted with hydrated silica 4 inside a reactor 5, which might be merged with dissolver 3 or be comprised of a replaceable cartridge containing hydrated silica.

The fluorinated gases ($SiF_4$ and/or $H_2SiF_6$) being formed are fed to a washer 6 where said gases are treated with a basic solution 7. Said solution loaded with fluorinated compounds then enters an evaporator 8 and the solid residue which is obtained therein is fed to an equipment 9 for treating radio-active wastes.

After a contacting time of about 15 minutes inside reactor 5, the solid phase loaded with fluoride ions is separated from the liquid phase inside a filter, centrifuge or similar separating device 10.

The liquid phase which has been relieved substantially completely from the fluoride ions, is fed to an equipment for purifying and extracting nuclear fuel ("Purex") 11.

The solid phase is recycled to reactor 5, possibly after regenerating in 12. The radio-active residue resulting from said regenerating is also fed to equipment 9.

When the solid phase from the separating device 10 becomes too radio-active, said phase is discharged directly to equipment 9.

Regenerating occurs by pyro-hydrolysis and the fluorinated gases being formed by such treatment are also fed to washer 6.

It must be understood that the invention is in no way limited to the above embodiments and that many changes can be brought therein without departing from the scope of the invention as defined by the appended claims.

We claim:
1. A method for extracting fluoride ions from a nuclear fuel solution which is obtained by contacting said fuels with a mixture of $HNO_3$ and HF, which method comprises treating said solution with a solid phase of hydrated silica to bind at least the main portion of the fluorine to the silica, and then separating said solid phase so formed from the solution.

2. Method as defined in claim 1, in which the hydrated silica is in powdered form.

3. Method as defined in claim 1, which further comprises treating said solution with a solid phase of hydrated silica at a temperature lying between 15° C. and 50° C.

4. Method as defined in claim 1, in which the hydrated silica is used in an amount lying between 80 and 130 g per liter from 0.1 M-HF solution.

5. Method as defined in claim 1, in which said solid phase separated from the solution is recycled.

6. Method as defined in claim 5, in which said solid phase separated from the solution is regenerated by pyro-hydrolysis before being recycled.

7. Method as defined in claim 1, in which part of the silica-bound fluorine is evaporated and recovered by washing with a basic solution.

8. Method as defined in claim 7, in which said basic washing solution is evaporated to produce a residue and the resulting residue is fed to a treatment for radioactive wastes.

9. Method as defined in claim 6, in which fluorinated vapours formed during said pyro-hydrolysis are recovered in a basic solution said solution is thereafter evaporated to produce a residue and the resulting residue is fed to a treatment for radio-active wastes.

10. Method as defined in claim 1, wherein said nuclear fuel solution is a $UO_2$ nuclear fuel solution, a $PuO_2$ nuclear fuel solution or a $ThO_2$ nuclear fuel solution, or a mixture thereof.

11. Method as defined in claim 1, wherein said hydrated silica is silica gel, silicic acid or a mixture thereof.

12. Method as defined in claim 7, wherein said basic solution is a sodium hydroxide solution or a sodium carbonate solution.

13. Method as defined in claim 9, wherein said basic solution is a sodium hydroxide solution or a sodium carbonate solution.

* * * * *